(12) United States Patent
Choi et al.

(10) Patent No.: US 12,232,484 B2
(45) Date of Patent: Feb. 25, 2025

(54) AUTOMATIC DEFECATION BOARD FOR COMPANION ANIMAL

(71) Applicants: Yoonja Choi, Seoul (KR); Gana Kim, Seoul (KR)

(72) Inventors: Yoonja Choi, Seoul (KR); Gana Kim, Seoul (KR)

(*) Notice: Subject to any disclaimer, the term of this patent is extended or adjusted under 35 U.S.C. 154(b) by 68 days.

(21) Appl. No.: 18/030,075

(22) PCT Filed: Sep. 28, 2021

(86) PCT No.: PCT/KR2021/013234
§ 371 (c)(1),
(2) Date: Apr. 4, 2023

(87) PCT Pub. No.: WO2022/080705
PCT Pub. Date: Apr. 21, 2022

(65) Prior Publication Data
US 2023/0371464 A1 Nov. 23, 2023

(30) Foreign Application Priority Data
Oct. 14, 2020 (KR) .................. 10-2020-0132391

(51) Int. Cl.
*A01K 1/01* (2006.01)

(52) U.S. Cl.
CPC ............ *A01K 1/011* (2013.01); *A01K 1/0146* (2013.01)

(58) Field of Classification Search
CPC ...... A01K 1/01; A01K 1/0103; A01K 1/0107; A01K 1/011; A01K 1/0146; A47K 17/00
See application file for complete search history.

(56) References Cited

U.S. PATENT DOCUMENTS

| | | | |
|---|---|---|---|
| 2015/0053140 A1 | 2/2015 | Roh | |
| 2017/0339911 A1* | 11/2017 | Fitch | ............... A01K 1/01 |
| 2019/0059316 A1* | 2/2019 | Do | ............... A01K 1/01 |

FOREIGN PATENT DOCUMENTS

| | | |
|---|---|---|
| KR | 10-2008-0057947 A | 6/2008 |
| KR | 10-1178799 B1 | 8/2012 |
| KR | 10-1624467 B1 | 5/2016 |
| KR | 10-2017-0066995 A | 6/2017 |
| KR | 10-2112815 B1 | 5/2020 |

OTHER PUBLICATIONS

International Search Report for PCT/KR2021/013234 mailed Dec. 27, 2021 from Korean Intellectual Property Office.

* cited by examiner

*Primary Examiner* — Joshua J Michener
*Assistant Examiner* — Henry Hooper Mudd
(74) *Attorney, Agent, or Firm* — Revolution IP, PLLC

(57) ABSTRACT

An automatic defecation board for a companion animal is provided that automatically cleans urine and feces of the companion animal by using a human toilet, and the present disclosure enables the defecation board to be lifted and tilted to be connected to a toilet used by a person to remove dirt from the defecation board through the toilet, and the defecation board reduces the hassle of removing feces from the companion animal and allows them to manage the toilet even when they are away from home, and the companion animal uses it without resistance by using a bottom plate in the form of a defecation board used by existing companion animal.

3 Claims, 6 Drawing Sheets

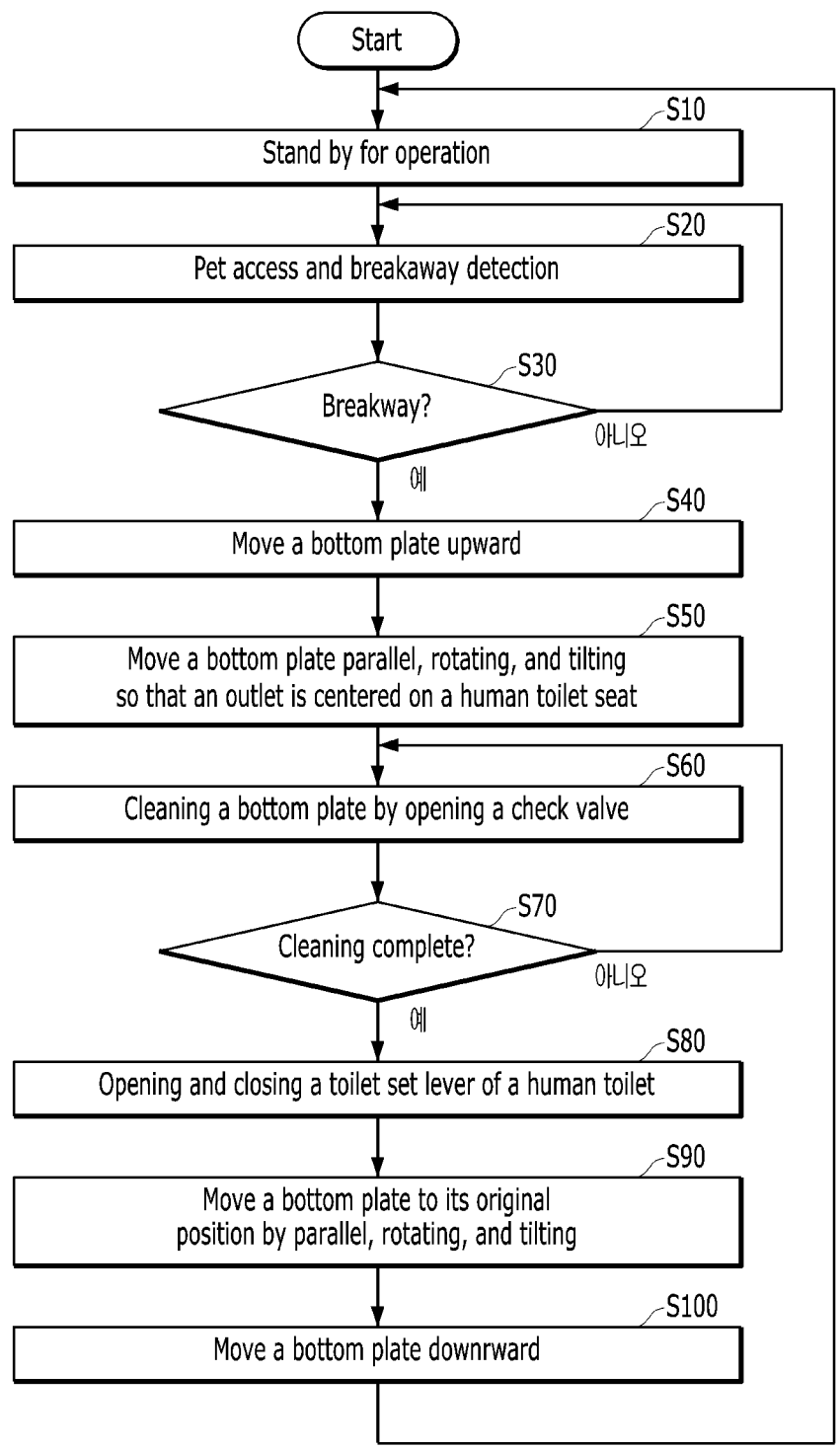

AUTOMATIC DEFECATION BOARD FOR COMPANION ANIMAL

TECHNICAL FIELD

The present disclosure relates to an automatic defecation board for a companion animal, and more particularly, to an automatic defecation board for a companion animal that automatically cleans urine and feces of the companion animal using a human toilet.

BACKGROUND TECHNOLOGY

A companion animal mainly refers to animals such as dogs and cats, and as the number of single-person households increases rapidly, the demand for pets is increasing day by day to appease the loneliness of modern people or to feel loved, and various pet-related businesses and items are continuously emerging in response to this trend.

There may be many important points when raising the companion animal, but one of the important things is to designate a place for the pet to defecate and train the pet to defecate at a specific defecation location.

In the past, the companion animal was often trained to defecate on the toilet bottom, but now excrement prop for the companion animal with various functions have been released to provide convenience for cleaning.

The known excrement prop consists of a defecation collecting and a net, and when the companion animal sits on the net and defecates, the owner collects feces on the net and separately collects the urine collected in the defecation collecting through a through hole of the net.

However, the feces collected on the net are easy to collect, but in the case of urine, since it gathers in the defecation collecting, there is a hassle of having to clean the defecation collecting frequently with the net after separating the net, and if the cleaning is neglected, the odor remains indoors.

In order to solve this problem, the excrement prop with various functions and a excrement device for the companion animal with automatic cleaning functions are published; for examples, Korea Registration Patent Publication No. 10-1178799 Aug. 27, 2012 and Korea Korean Registration Patent Publication No. 10-1624467 May 19, 2016. In particular, the excrement prop for the companion animal with an automatic cleaning function detects whether the companion animal has defecated by a sensor, and then sends stored water to the excrement prop to clean and drain the water after cleaning.

Through this function, the owner can manage the excrement prop more conveniently, and the owner who usually lives in a studio or master bedroom allows the companion animal to live in the same space as the owner, so not only the companion animal house but also the companion animal toilet is often placed in the master bedroom.

However, the existing automatic toilet for the companion animal consist of independent toilets that are not linked to human toilets. Also, the urine can be washed automatically, but the feces is automatically separated and removed by a person himself or by a person without automatic separation.

Accordingly, although it is an automatic toilet, it has a limitation in that it must be accompanied by the action of removing urine and feces by a person, and the odor caused by the feces is as vulnerable as general toilets.

DETAILED EXPLANATION OF THE INVENTION

Technical Challenges

Therefore, the present disclosure is designed to solve the above problem, and it provides an automatic defecation board for companion animal that automatically cleans the urine and feces of the companion animal by using a human toilet.

The present disclosure is to provide an automatic defecation board for a companion animal that may remove dirt from the defecation board through a human toilet in connection with a toilet used by a person by lifting and tilting a defecation board.

The purposes of the present disclosure are not limited to those mentioned above, and other purposes and advantages of the present disclosure not mentioned can be understood by the following explanation and will be more clearly understood by the exemplary embodiments of the present disclosure. Also, it will be easy to understand that the purposes and advantages of the present disclosure can be realized by means and combinations thereof indicated in the scope of the claim.

Technical Solution

To achieve the above purpose, the characteristics of an automatic defecation board for a companion animal according to the present disclosure may comprise a main body 100 having a certain height that connects a cable 10 electrically connected to an electronic opening/closing control device attached to a human toilet lever and an inlet pipe 20 that introduces water supplied from an outside; a bottom plate 200 forming a jaw so that the companion animal can land and defecate and collect this defecation; a bottom plate driving unit 300 in which the bottom plate 200 is coupled to the main body 100 using at least one of a rotary motor, a cam, a crank, a pinion, and a gear (sawtooth), and drives a movement of the bottom plate 200 using at least one of parallel motion, rotary motion, and tilt motion; an upper and lower driving unit 400 that moves the bottom plate 200 coupled to the main body 100 up and down to raise the height of the human toilet 30 or more, by using at least one of the rotary motor, the cam, the crank, the pinion and the gear (sawtooth); a sensing sensor unit 500 which is installed around the bottom plate 200 and senses the weight applied to the bottom plate 200 or detects whether the companion animal approaches or leaves the top of the bottom plate 200; a cleaning unit 600 which is located on one side of the main body 100 and discharges/sprays water into the inner space of the bottom plate 200 using water flowing into an inlet pipe 20 to clean the defecation in the bottom plate 200; an electronic lever 700 electrically connected to the toilet seat lever of the human toilet 30 to open and close the toilet seat lever electronically; and a control unit 800 that controls the bottom plate driving unit 300, the upper and lower driving units 400, the sensing sensor unit 500, and the electronic lever 700.

Preferably, the bottom plate 200 includes a net 210 in which a plurality of through holes, which is a place where the companion animal is seated and defecates, are formed; a defecation collecting 220 that is coupled in a detachable manner using the net 210 and the coupling portion 240 to temporarily store the defecation of the companion animal; and a fastening part provided on one side of the defecation collecting 220 and fastened to and detached from the main body 100, wherein the defecation collecting may have an inclined slop toward the discharge port 230 so that sewage contained after washing can be collected at the center of one side or at the discharge port 230 provided on one side.

Preferably, the sensing sensor unit 500 may determine whether the companion animal has defecated through the time the companion animal stays on the bottom plate 200, as well as at which location the companion animal has defecated.

Effects of the Invention

As described above, the automatic defecation board for the companion animal according to the present disclosure has the following effects.

First, after the companion animal defecates, the defecation is automatically cleaned using water within a few minutes, reducing the odor caused by the defecation.

Second, it reduces the hassle of people having to remove feces excreted by the companion animal, allowing them to manage the bathroom even when they are away from home.

Third, by using the bottom plate in the form of a defecation board used by existing companion animal, the companion animal can use it without resistance.

In addition to the above-described effects, the detailed effects of the present disclosure will be described together with the detailed description for implementing the present disclosure.

BRIEF EXPLANATION OF THE DRAWING

FIG. 3 is a flowchart illustrating a method of operating the automatic defecation board for the companion animal according to the exemplary embodiment of the present disclosure.

In addition.

[Form for Implementing an Invention]

Figure 1:
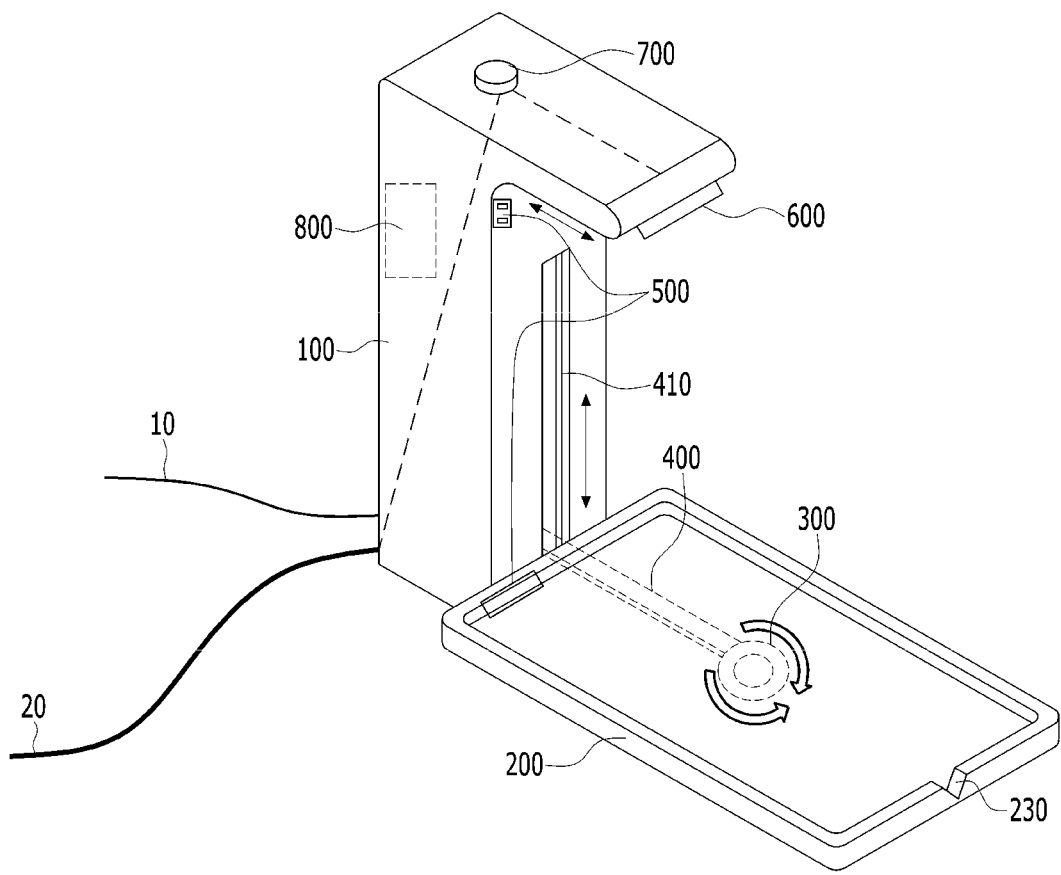
FIG. 1 is a block diagram illustrating a constitution of an automatic defecation board for a companion animal according to an exemplary embodiment of the present disclosure.

Other purposes, characteristics, and advantages of the present disclosure will be apparent through the detailed description of the exemplary embodiments referring to the accompanying drawings.

The terminology used herein is defined in consideration of the function of corresponding components used in the present disclosure and may be varied according to users, operator's intention, or practices. In addition, an arbitrary defined terminology may be used in a specific case and will be described in detail in a corresponding description paragraph. Therefore, the terminology used herein is for the purpose of describing particular embodiments only and is not intended to be limiting of the invention.

A preferred embodiment of the automatic defecation plate for companion animal according to the present disclosure will be described below with reference to the accompanying drawings. However, this invention is not limited to the embodiments disclosed below, but may be implemented in various forms, provided that the disclosure of this invention is complete and that those of ordinary skill are fully informed of the scope of the invention. Therefore, the exemplary embodiments described in the specification and the constitution shown in the drawings are only the most desirable exemplary embodiments of the invention and do not represent all of the technical ideas of the invention, and thus, it should be understood that at the time of the present application, there may be various equivalents and modified examples that may replace them.

Hereinafter, the "upper portion (or lower portion)" of the component or the "upper (or lower)" of the component hereinafter may mean that any component is not only placed in contact with the upper surface (or lower surface) of the component, but also another component may be interposed between the component and any component placed on it.

Also, it should be understood that if one component is described as "connected", "combined", or "contacted" to another component, the components may be directly connected or contacted to each other, but that different components can be "interposed" between each component, or that different components may be "connected", "combined", or "contacted" through another component.

FIG. 1 is a block diagram illustrating a constitution of an automatic defecation board for a companion animal according to an exemplary embodiment of the present disclosure. The automatic defecation board for the companion animal illustrated in FIG. 1 is an exemplary embodiment, the components thereof are not limited to the embodiment shown in FIG. 1, and some of the components may be added, changed, or deleted as necessary.

As illustrated in FIG. 1, the automatic defecation board for the companion animal according to the present disclosure may include a main body 100, a bottom plate 200, a bottom plate driving unit 300, an upper and lower driving unit 400, a sensing sensor unit 500, a cleaning unit 600, an electronic lever 700, and a control unit 800.

The main body 100 may have a certain height in which a cable 10 electrically connected to an electronic opening/closing control device attached to a human toilet seat lever is connected to an inlet pipe 20 for introducing water supplied from the outside. Specifically, the main body 100 may be provided with a check valve for supplying water to the inlet pipe 20. The check valve is opened and closed under the control of the control unit 800, and any one of electronic and mechanical check valves currently known may be used.

For reference, when the check valve is opened, the introduced water may be introduced into the inlet pipe 20 and supplied to the cleaning unit 600. In this case, the inlet pipe 20 has a structure that may be easily separated from the main body 100 in a simple manner.

The bottom plate 200 has a jaw formed so that the companion animal can land and defecate and collect this defecation.

Figure 2:
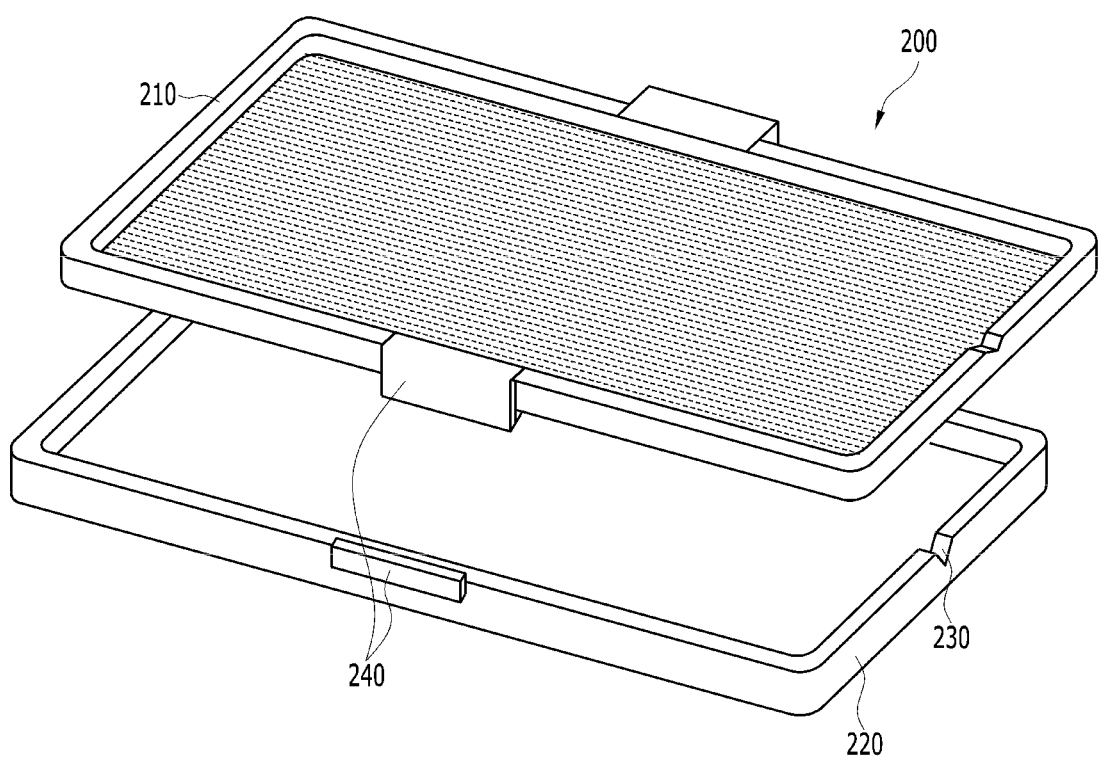
FIG. 2 is a block diagram specifically illustrating the bottom plate 200 of FIG. 1.

FIG. 2 is a block diagram specifically illustrating the bottom plate 200 in FIG. 1, and the bottom plate 200 includes a net 210 in which a plurality of through holes, which is a place where the companion animal is seated and defecates, are formed; a defecation collecting 220 that is coupled in a detachable manner using the net 210 and the coupling portion 240 to temporarily store the defecation of the companion animal; and a fastening part (not shown) provided at one side of the defecation collecting 220 and fastened to and detached from a coupling part not shown provided in the main body 100.

The net 210 is commonly founded in a known excrement prop 100 and is formed in a thin panel shape in a state in which a plurality of through holes are formed, and is detachably mounted on the upper portion of the defecation collecting 220. That is, the net 210 provides a flat and wide space for the companion animal to come up and defecate, and a plurality of through holes are formed through which defecation, especially urine, can be transferred to the defecation collecting 220. In addition, the net 210 is detachably coupled from the defecation collecting 220 to collect or clean the defecation in the defecation collecting 220.

In addition, the defecation collecting 220 performs a function of storing the feces mainly urine of the companion animal through the through hole of the net 210, and is formed under the net 210 to have a certain volume, and the water supplied from the cleaning unit 600 can be sprayed into the inner space to clean, and then sewage including urine can be removed through the human toilet 30 after washing. In this case, when the wastewater contained after washing is tilted to the human toilet, the defecation collecting 220 may be inclined to the discharge port 230 so that the wastewater can be collected at the center of one side or at one side.

The bottom plate driving unit 300 may drive the movement of the bottom plate 200 using at least one of the rotary motor, the cam, the crank, the pinion, and the gear sawtooth to a coupling part provided in the main body 100 using at least one of parallel motion, rotation motion, and tilt motion. That is, the bottom plate driving unit 300 drives the movement of the bottom plate 200 so that the discharge port 230 of the washed bottom plate 200 can come to the center of the human toilet 30, and the opposite side of the discharge port 230 can be adjusted to a higher position than the discharge port 230 so that sewage can naturally flow to the discharge port by gravity.

The upper and lower driving units 400 may vertically move the bottom plate 200 fastened to the coupling unit provided in the main body 100 using at least one of the rotating motor, the cam, the crank, the pinion, and the gear sawtooth to raise the height of the human toilet 30. In this case, the upper and lower driving units 400 may be connected to the bottom plate driving unit 300. The upper and lower driving units 400 may be connected to the pillar of the main body 100 to lift the bottom plate 200 in a forklift type or may push the bottom plate 200 under the bottom plate 200. To this end, a hole 410 may be provided as a pillar of the main body 100.

The sensing sensor unit 500 is installed around the bottom plate 200 and may detect a weight applied to the bottom plate 200 or whether the companion animal approaches or leaves the upper portion of the bottom plate 200. To this end, the sensing sensor unit 500 may include a weight sensor and an infrared sensor, and the weigh sensor may be located at a lower end of the bottom plate 200, and the infrared sensor may be located at a upper end of a predetermined height of the bottom plate 200.

Like this, the sensing sensor unit 500 may check whether the companion animal is seated on or close to the bottom plate 200. Furthermore, the sensing sensor unit 500 may determine whether the companion animal has defecated through the time the companion animal stays on the bottom plate 200, as well as where the companion animal has defecated. That is, the sensing sensor unit 500 is not limited to determining whether the companion animal defecates, but the defecation position of the companion animal can be determined by determining whether there is a weight, a deviation in the separation distance from the reference distance, and whether the weight is concentrated on a specific area.

Meanwhile, the sensing sensor unit 500 may receive a sensor signal sensed by a sensor and perform a function of determining whether the companion animal has defecated on the bottom plate 200. That is, the sensor signal (measurement data) may be compared with reference data stored in the reference database to finally determine whether defecation occurs. However, the present disclosure is not limited thereto, and reference data reference weight, reference position may be provided in the sensing sensor 500 itself.

The cleaning unit 600 may be positioned at one side of the main body 100 and may discharge/spray water into the inner space of the bottom plate 200 using water introduced into the inlet pipe 20 to clean the feces in the bottom plate 200. Thereafter, the sewage contained after washing flows to the human toilet by tilting the bottom plate 200. When washing is performed in the cleaning unit 600, the bottom plate 200 is maintained in a tilted state toward the human toilet 30 so that water generated for washing can flow to the human toilet 30 together with sewage including urine at the same time as discharging/spraying.

The cleaning unit 600 may be located at an upper end of the main body 100 or an upper end of one side of the bottom plate 200. That is, the cleaning unit 600 may remove dirt by supplying water to the bottom plate 200. This is the same as the principle that a person directly holds the bottom plate 200 and cleans the existing defecation board with a shower.

In this case, the cleaning unit 600 may include a high-pressure nozzle provided in the direction to a lower end from an upper end of the main body 100 to discharge high-pressure water in a straight line. The high-pressure nozzle may be detected to be inclined at a predetermined angle with respect to a vertical direction, thereby enabling washing of the side surface or the rear surface of the bottom plate 200.

The electronic lever 700 may be electrically connected to the toilet seat lever of the human toilet 30 to open and close the toilet seat lever electronically. In this case, an electronic opening/closing control device should be attached to the toilet seat lever of the human toilet 30.

The control unit 800 may control the bottom plate driving unit 300, the upper and lower driving units 400, the sensing sensor unit 500, and the electronic lever 700. In other words, it is possible to control the position and angle of the bottom plate 200 to detect and clean the entry and departure of companion animal, to supply water to the cleaning unit 600 by opening and closing the electronic lever 700, and to flush the human toilet 30.

The operation of the automatic defecation board for the companion animal according to the present disclosure configured as described above will be described in detail with reference to the accompanying drawings. The same reference numerals as in FIG. 1 or FIG. 2 refer to the same member performing the same function.

FIG. 3 is a flowchart illustrating a method of operating the automatic defecation board for the companion animal according to the exemplary embodiment of the present disclosure. In addition, FIGS. 4a to 4c are constitution diagrams for explaining the method of operating the automatic defecation board for the companion animal shown in FIG. 3.

Figure 4A:
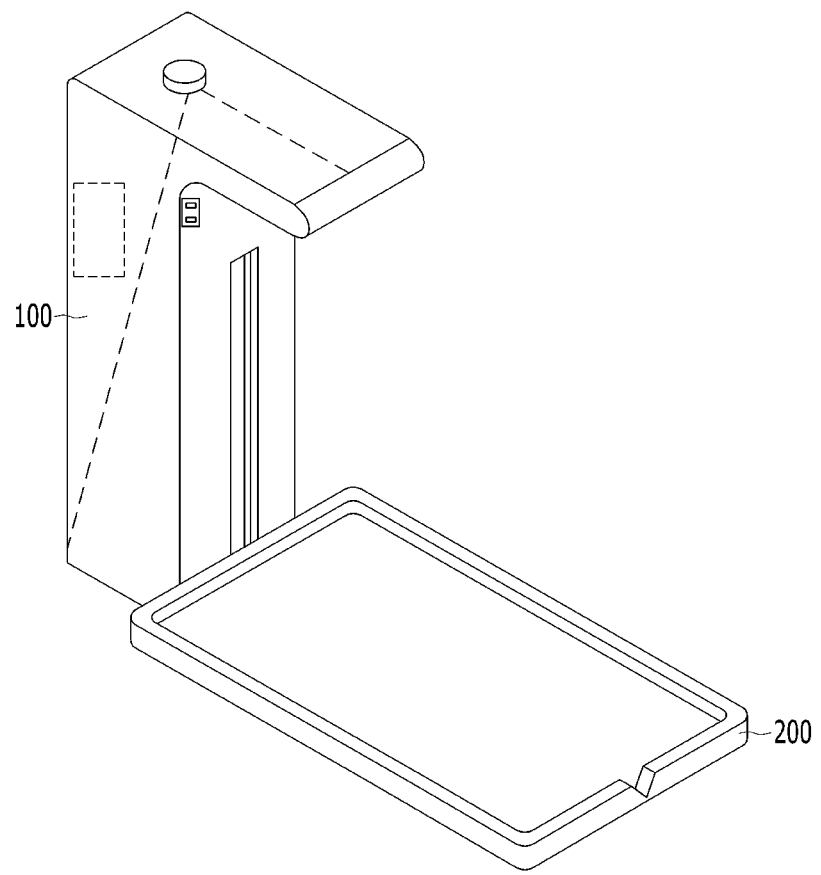
FIGS. 4a to 4c are constitution diagrams for explaining the method of operating the automatic bottom plate for the companion animal indicated in FIG. 3.
Figure 4B:
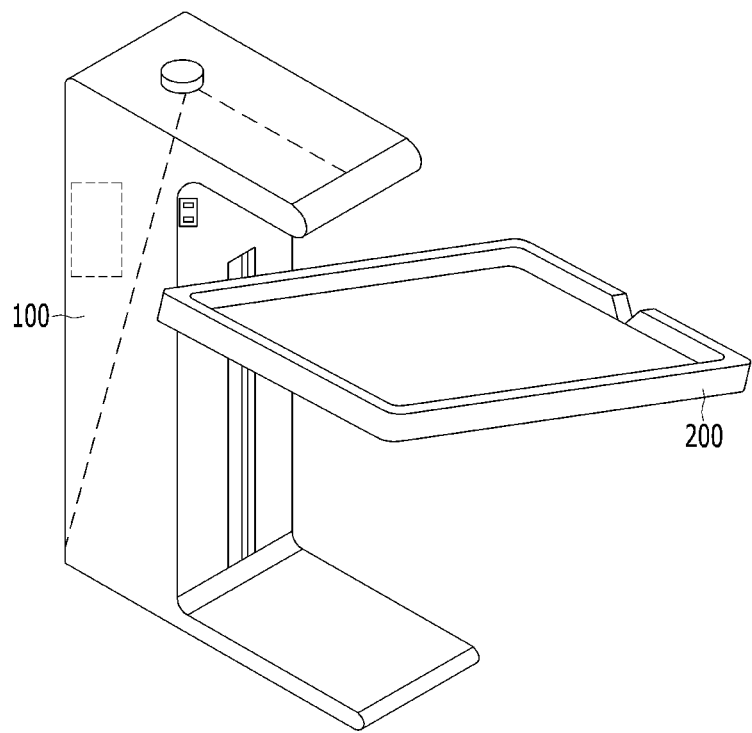
Figure 4C:
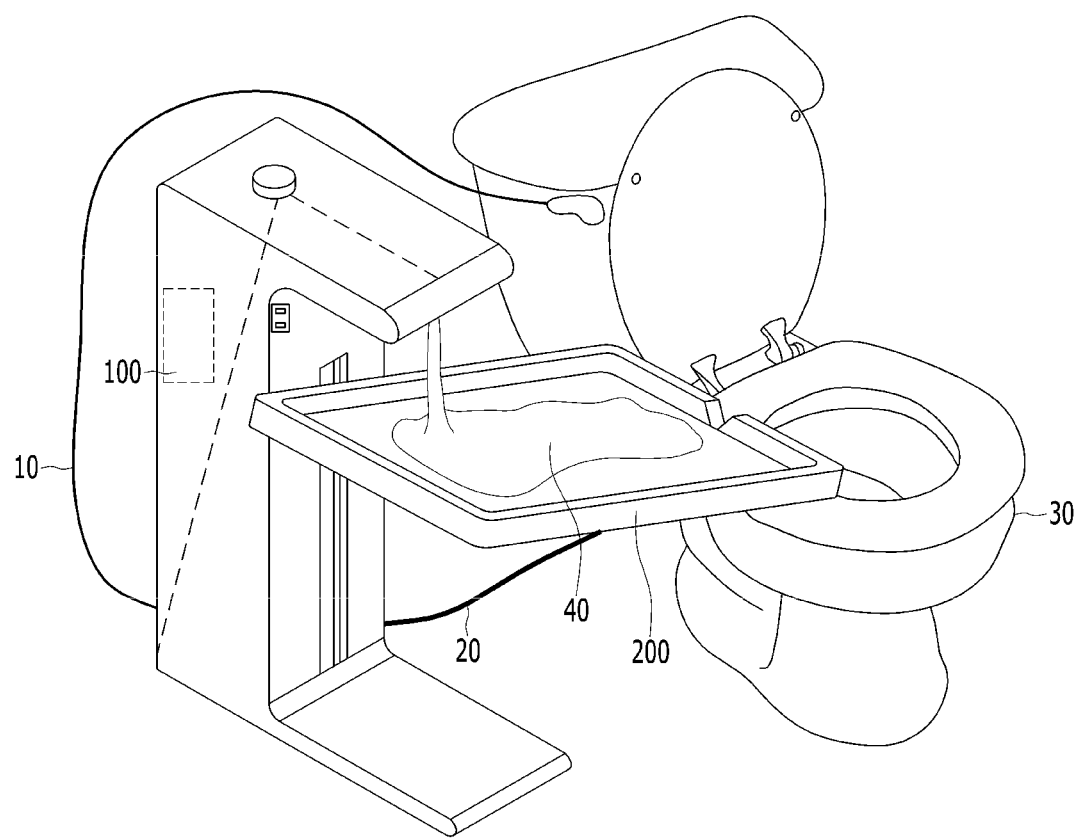

Referring to FIG. 3, first, as illustrated in FIG. 4a, the automatic defecation board for the companion animal maintains the status awaiting operation as a state in which the bottom plate 200 is positioned at the lowest end of the main body 100 (S10).

The automatic defecation board for the companion animal may detect the weight applied to the bottom plate 200 using the sensing sensor unit 500 while in the atmosphere, or may detect whether the companion animal approaches and deviates from the top of the bottom plate 200 (S20). Like this, the sensing sensor unit 500 may check whether the companion animal is seated on or close to the bottom plate 200. In addition, the sensing sensor unit 500 may determine whether the companion animal has defecated through the time the companion animal stays on the bottom plate 200, as well as where the companion animal has defecated. That is, the sensing sensor unit 500 is not limited to determining whether the companion animal defecates, but the defecation position of the companion animal can be determined by determining whether there is a weight, a deviation in the separation distance from the reference distance, and whether the weight is concentrated on a specific area.

And, as a result of the detection (S20), if the companion animal is determined to be off the bottom plate 200 (S30), the bottom plate 200 that is fastened to the joint provided in the main body 100 can be moved upward using the upper and lower driving units 400 to raise the height of the human toilet 30 (S40). In this case, the upper and lower driving units 400 may be connected to the pillar of the main body 100 to lift the bottom plate 200 in a forklift type or push the bottom plate 200 under the bottom plate 200.

Subsequently, using the bottom plate driving unit 300, the bottom plate 200 positioned in the upper portion may be moved so that the discharge port 230 of the bottom plate 200 may be located in the center of the human toilet 30 using at least one of parallel motion, rotational motion, and tilt motion (S50).

And, as illustrated in FIG. 4b, water located on one side of the main body 100 using a cleaning unit 600 and flowing into the inlet pipe 20 is discharged/sprayed into the inner space of the bottom plate 200 using a check valve, thereby washing the feces in the bottom plate 200 (S60). In this case, as illustrated in FIG. 4c, as the bottom plate 200 is inclined toward the human toilet, the water generated for washing may flow naturally to the human toilet 30 together with the sewage (including the urine 40) at the same time as discharging/spraying.

For reference, the control unit 800 may control the time at which water is discharged/sprayed from the cleaning unit 500 differently according to the type of defecation of the companion animal located on the bottom plate 200. That is, when the defecation is the feces, it is possible to control the discharge/spray of water for a longer time than when it is the urine.

Subsequently, when it is determined that the washing is completed i.e., when the set time is completed (S70), the control unit 800 may electronically open and close the toilet lever of the human toilet 30 by controlling the electronic lever 700 electrically connected to the toilet lever of the human toilet 30 (S80).

And, using the bottom plate driving unit 300, the bottom plate 200 positioned in the upper part is positioned horizontally in the initial direction original position using at least one of parallel motion, rotational motion, and tilting motion (S90).

Subsequently, the bottom plate 200 may be positioned at the lowest end of the main body 100 by using the upper and lower driving units 400 (S100).

And, as shown in FIG. 4a, the initial standby state is maintained (S10).

As described above, the automatic defecation board for the companion animal according to the present disclosure can be used in connection with the toilet 30 used by humans by lifting and tilting the bottom plate 200. This does not require special configuration and technology, and dirt on the automatic toilet plate for companion animal can be removed through the human toilet 30 by configuring the connection between the automatic toilet plate for companion animal and the human toilet 30 based on the standardized configuration and techniques.

Meanwhile, the device according to the disclosed exemplary embodiment may incorporate all documents including cited publication documents, patent applications, patents, etc. into the disclosed embodiment in the same manner as each cited document is individually and specifically combined or combined in the disclosed exemplary embodiment.

For understanding of the disclosed exemplary embodiments, reference numerals are described in the preferred exemplary embodiments illustrated in the drawings, and specific terms are used to explain the disclosed exemplary embodiments, but the disclosed exemplary embodiments are not limited by the specific terms, and the disclosed exemplary embodiments may include all components generally considered by a person skilled in the art.

Certain implementations described in the disclosed embodiment are embodiments, and do not limit the scope of the disclosed embodiment in any method. For the sake of simplicity of the specification, descriptions of conventional electronic configurations, control systems, software, and other functional aspects of the systems may be omitted. In addition, the connections or connections of the lines between the components shown in the drawing exemplify functional connections and/or physical or circuit connections, which can be alternative or additional various functional connections, physical connections, or circuit connections in the actual device. In addition, it may not be a necessary component for the application of the disclosed embodiment unless specifically stated, such as "essential", "important", etc.

A person skilled in the art in the technical field of the present disclosure will understand that various embodiments are possible within the scope of the technical idea of the present invention. Therefore, the true technical protection scope of the present disclosure should be determined by the technical idea of the appended claims.

INDUSTRIAL USABILITY

The present disclosure relates to an automatic defecation board for companion animal, and it is industrially applicable.

The invention claimed is:

1. An automatic defecation board for a companion animal, comprising:
   a main body (100) having a certain height that connects a cable (10) electrically connected to an electronic opening/closing control device attached to a human toilet lever and an inlet pipe (20) that introduces water supplied from an outside;
   a bottom plate (200) forming a jaw so that the companion animal lands and defecates;
   a bottom plate driving unit (300) in which the bottom plate (200) is coupled to the main body (100) using at least one of a rotary motor, a cam, a crank, a pinion, and a gear sawtooth, and drives a movement of the bottom plate (200) using at least one of parallel motion, rotary motion, and tilt motion;
   an upper and lower driving unit (400) that moves the bottom plate (200) coupled to the main body (100) up and down to raise the height of the human toilet (30) or more, by using at least one of the rotary motor, the cam, the crank, the pinion and gear sawtooth;
   a sensing sensor unit (500) which is installed around the bottom plate (200) and senses the weight applied to the bottom plate (200) or detects whether the companion animal approaches or leaves the top of the bottom plate (200);

a cleaning unit (600) which is located on one side of the main body (100) and discharges/sprays water into the inner space of the bottom plate (200) using water flowing into an inlet pipe (20) to clean the defecation in the bottom plate (200);

an electronic lever (700) electrically connected to the toilet seat lever of the human toilet (30) to open and close the toilet seat lever electronically; and a control unit (800) that controls the bottom plate driving unit (300), the upper and lower driving units (400), the sensing sensor unit (500), and the electronic lever (700).

2. The automatic defecation board for the companion animal of claim 1, wherein the bottom plate (200) includes a net (210) in which a plurality of through holes, which is a place where the companion animal is seated and defecates, are formed; a defecation collecting (220) that is coupled in a detachable manner using the net (210) and the coupling portion (240) to temporarily store the defecation of the companion animal; and a fastening part provided on one side of the defecation collecting (220) and fastened to and detached from the main body (100), wherein the defecation collecting has an inclined slop toward the discharge port (230) so that sewage contained after washing is collected at the center of one side or at the discharge port (230) provided on one side.

3. The automatic defecation board for the companion animal of claim 1, wherein the sensing sensor unit (500) determines whether the companion animal has defecated through the time the companion animal stays on the bottom plate (200), as well as at which location the companion animal has defecated.

\* \* \* \* \*